US011932521B1

(12) United States Patent

Kistner et al.

(10) Patent No.: US 11,932,521 B1
(45) Date of Patent: Mar. 19, 2024

(54) TOILET HOIST

(71) Applicant: Kistner Family Trust, Midlothian, TX (US)

(72) Inventors: Kenneth J. Kistner, Midlothian, TX (US); Carolyn R. Kistner, Midlothian, TX (US)

(73) Assignee: The Kistner Family Trust, Midlothian, TX (US)

(*) Notice: Subject to any disclaimer, the term of this patent is extended or adjusted under 35 U.S.C. 154(b) by 0 days.

(21) Appl. No.: 18/458,761

(22) Filed: Aug. 30, 2023

(51) Int. Cl.
*B66C 5/00* (2006.01)
*B66C 5/02* (2006.01)

(52) U.S. Cl.
CPC .................................... *B66C 5/025* (2013.01)

(58) Field of Classification Search
CPC ........... B66C 5/025; B66C 1/10; B66C 1/107; B66C 1/12; B66C 1/14; B66C 13/46
See application file for complete search history.

(56) References Cited

U.S. PATENT DOCUMENTS 3,391,905 A * 7/1968 Burns ................... B62B 3/0625 254/133 R
4,084,706 A * 4/1978 Russell ................... B66C 1/625 414/640
4,239,443 A * 12/1980 Rysewyk .................. B66F 9/06 414/618
4,722,511 A * 2/1988 Chitwood ................. B66F 9/06 254/7 R
5,203,065 A * 4/1993 Peters ...................... B25H 1/00 254/2 R
5,373,593 A * 12/1994 Decky ....................... B62B 3/10 254/7 R
5,505,430 A * 4/1996 Barnett ..................... B62B 3/10 254/2 R
5,772,183 A * 6/1998 Sears ...................... B66C 5/025 254/323
6,015,137 A * 1/2000 Guevara .................. B66D 1/06 254/323
6,685,170 B1 * 2/2004 Gwynn ................... B66C 5/025 29/281.4
6,752,379 B1 * 6/2004 Wall ...................... B62B 5/0083 254/7 R
6,886,192 B1 * 5/2005 Merrill ....................... B62B 3/10 254/7 R
7,134,151 B1 * 11/2006 Cheramie ................. B62B 3/10 254/7 R (Continued)

FOREIGN PATENT DOCUMENTS

CA 2390260 A1 * 5/2000 ............... A61G 7/10
CN 204293409 U * 4/2015

(Continued)

*Primary Examiner* — Emmanuel M Marcelo
(74) *Attorney, Agent, or Firm* — James E. Walton

(57) ABSTRACT

A system and method for quickly and efficiently installing a toilet using a hoist. The toilet hoist includes a hoist base, at least one leg, a drive system, a power system, and at least one support mechanism. The at least one leg is coupled to the hoist base. The power system controls actuation of the drive system; when actuated, the drive system alters the vertical position of the support mechanism. The support mechanism is configured to secure a toilet for hoisting.

18 Claims, 19 Drawing Sheets

(56) References Cited

U.S. PATENT DOCUMENTS

| | | | | |
|---|---|---|---|---|
| 8,528,127 | B1 * | 9/2013 | Gabaldon | A61G 7/1007 4/480 |
| 10,099,906 | B2 * | 10/2018 | Smith | A47B 81/00 |
| 10,336,593 | B2 * | 7/2019 | Graham | B66C 1/18 |
| 2005/0169736 | A1 * | 8/2005 | Decky | B62B 1/002 414/490 |
| 2007/0057476 | A1 * | 3/2007 | Decky | B62B 5/0003 414/490 |
| 2011/0227379 | A1 * | 9/2011 | Fogleman | A61G 7/1046 254/2 R |

FOREIGN PATENT DOCUMENTS

| | | | | |
|---|---|---|---|---|
| CN | 111166586 | A * | 5/2020 | A61G 7/001 |
| CN | 216777441 | U * | 6/2022 | A61G 7/1019 |
| GB | 2182633 | A * | 5/1987 | A61G 7/1017 |
| JP | 2002017611 | A * | 1/2002 | |
| WO | WO-2015003258 | A1 * | 1/2015 | B65G 7/12 |

* cited by examiner

TOILET HOIST

BACKGROUND

1. Field of the Invention

The present application relates in general to the field of installing toilets, more specifically, to a method and device for hoisting and installing toilets.

2. Description of Related Art

When installing toilets, a wax ring is used on the flange to secure a toilet bowl in place. When moving the toilet into place over the flange, the base of the toilet needs to be aligned with bolts protruding up from the flange for proper installation. If the toilet bowl is not properly aligned with these bolts when placed on the wax, the seal connecting the flange to the toilet will not be properly set causing leakage or other problems. When that happens, the toilet would need to be picked up again and the whole installation process restarted. Resetting will also take time as a new wax seal will need to be inserted over the flange as the original will no longer be viable after the improper installation. Toilets are heavy and non-uniformly shaped objects and as such are not easy to freely maneuver without assistance or excess strain.

While there are many ways to hoist toilets for installation, well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
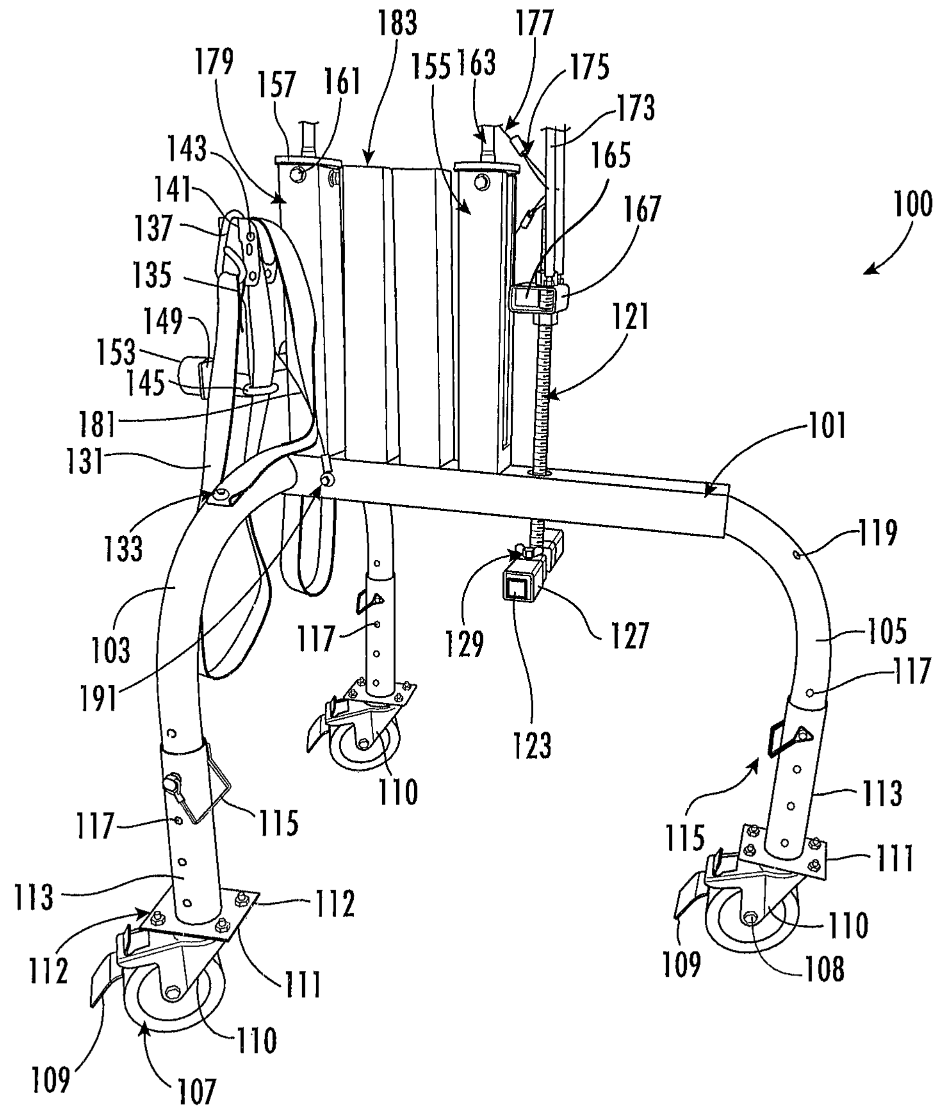
FIG. 1A is a perspective view of a toilet hoist according to a preferred embodiment of the present invention.
Figure 1B:
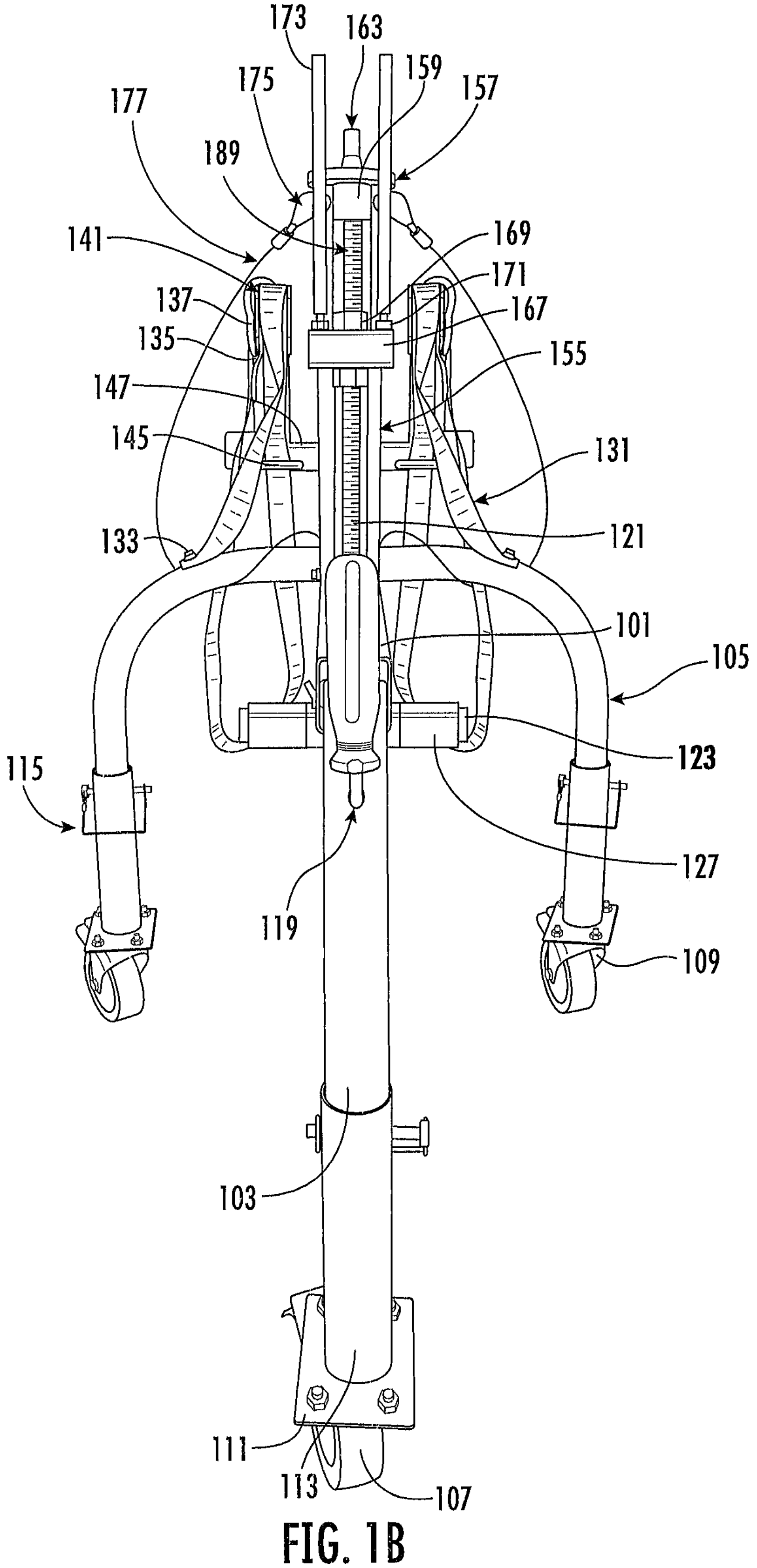
FIG. 1B is a front view of the toilet hoist of FIG. 1A.
Figure 1C:
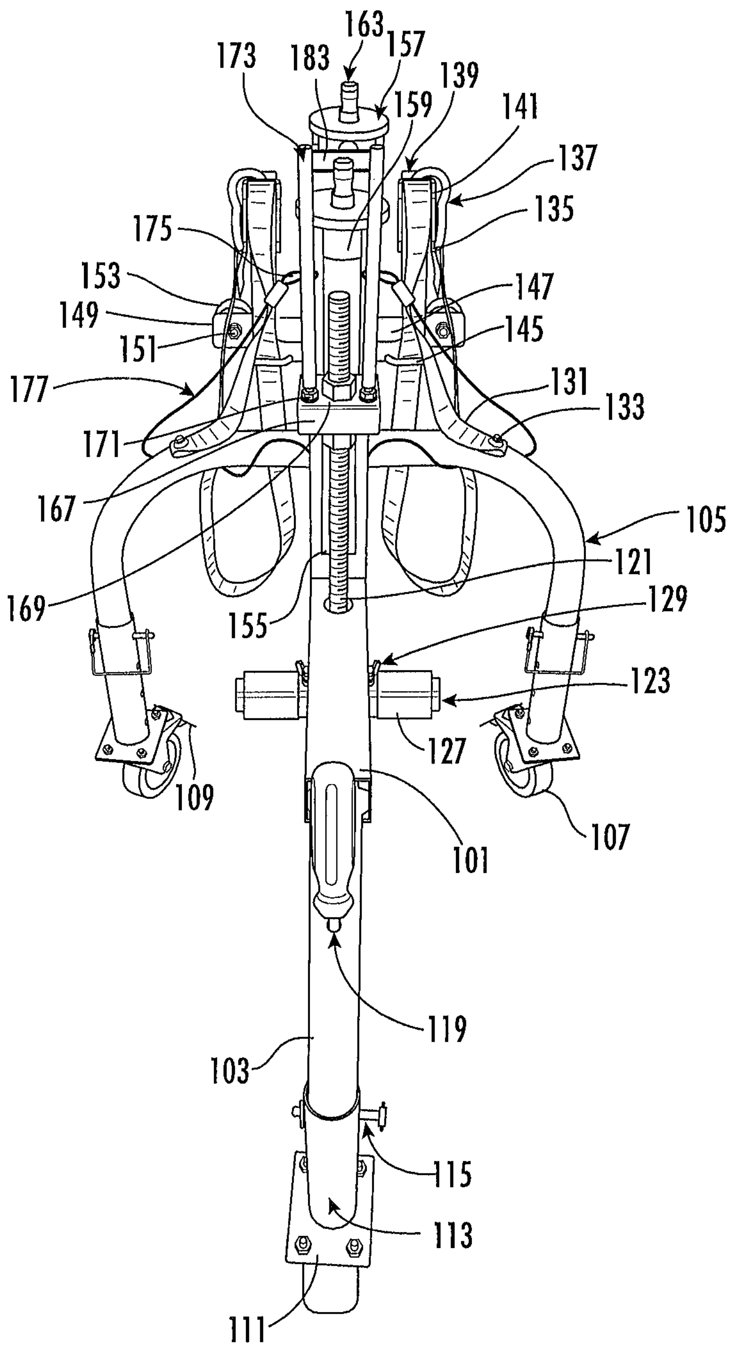
FIG. 1C is a front perspective view of the toilet hoist of FIG. 1A.
Figure 1D:
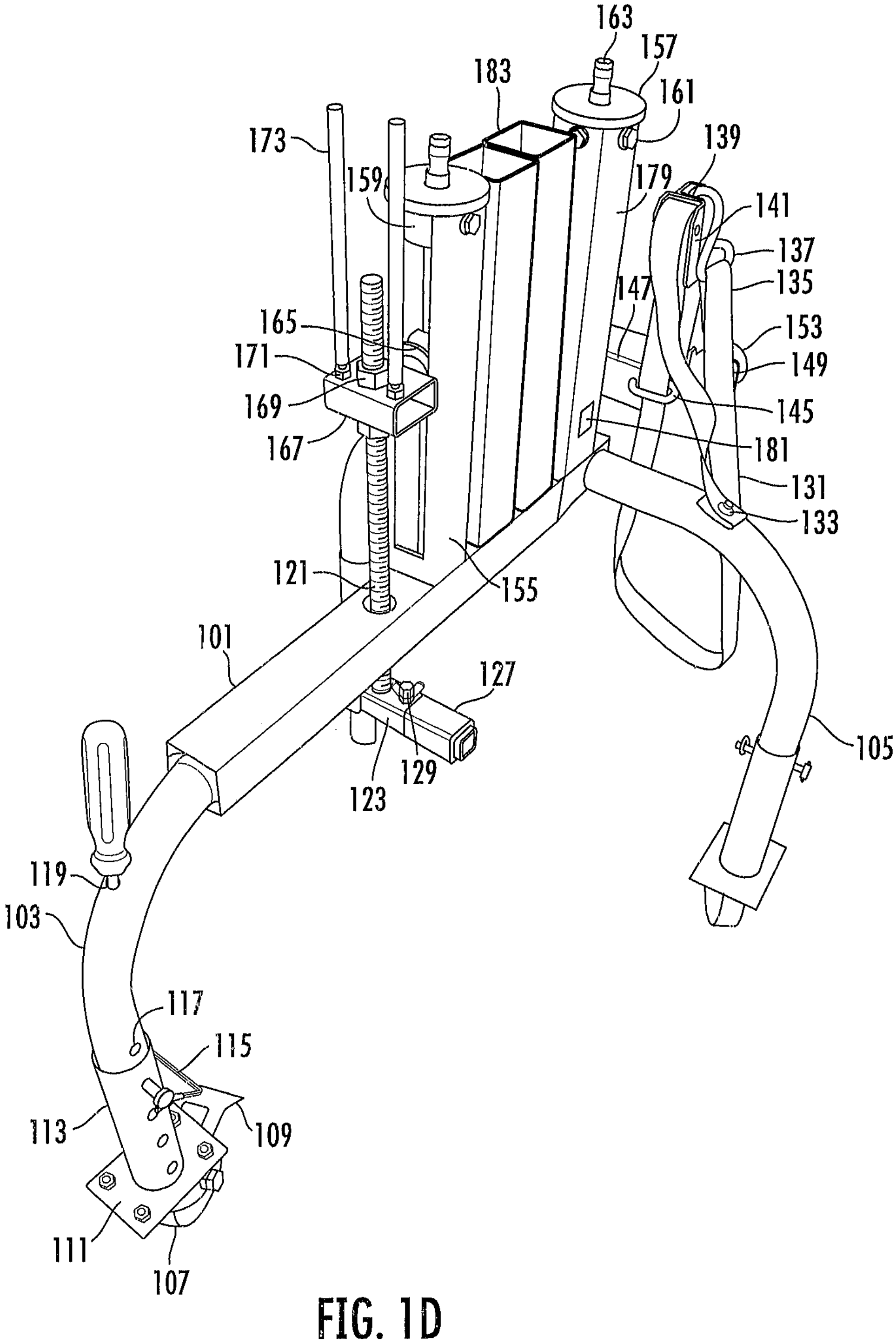
FIG. 1D is a perspective view of the toilet hoist of FIG. 1A.
Figure 1E:
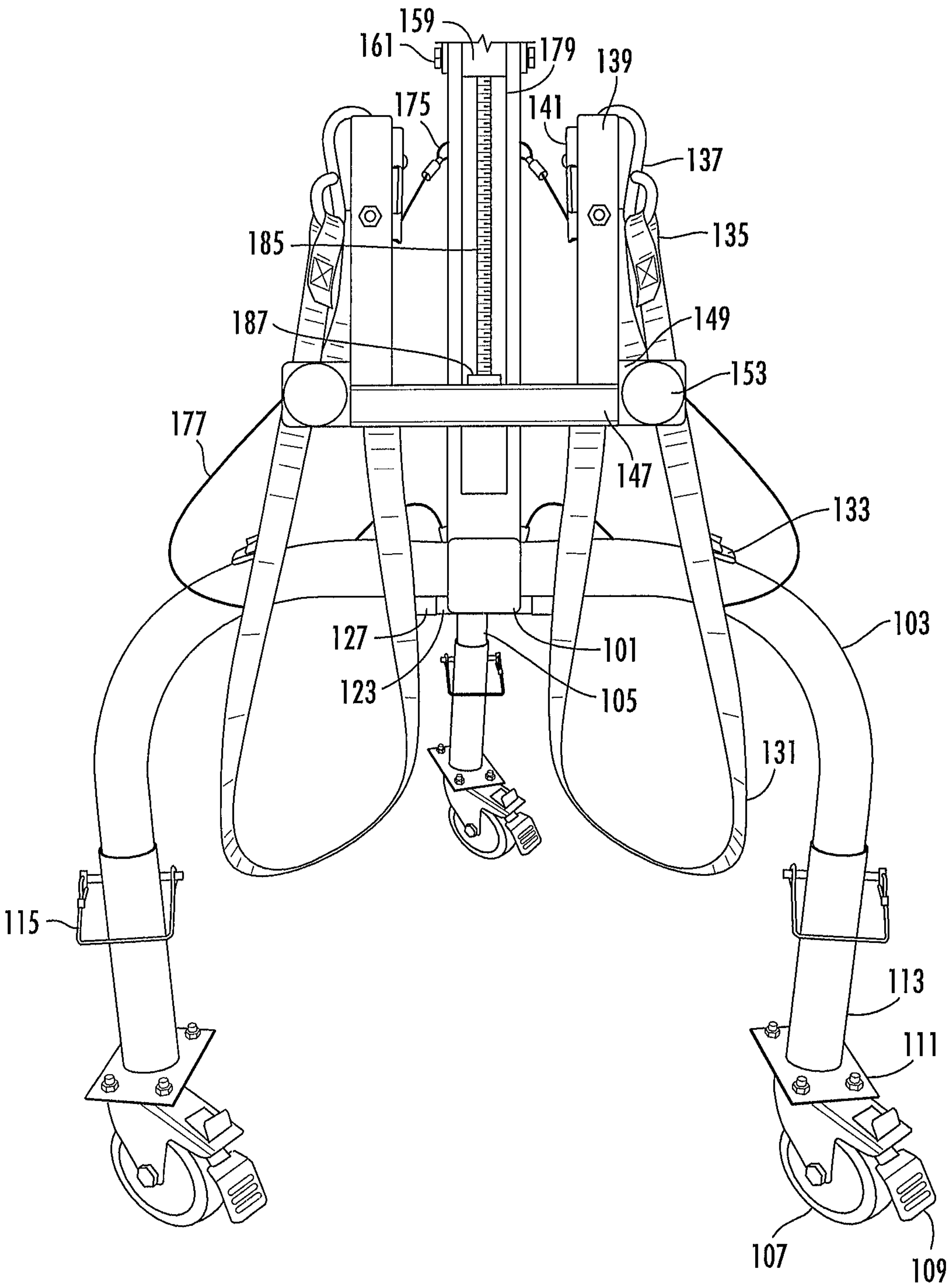
FIG. 1E is a rear view of the toilet hoist of FIG. 1A.
Figure 2A:
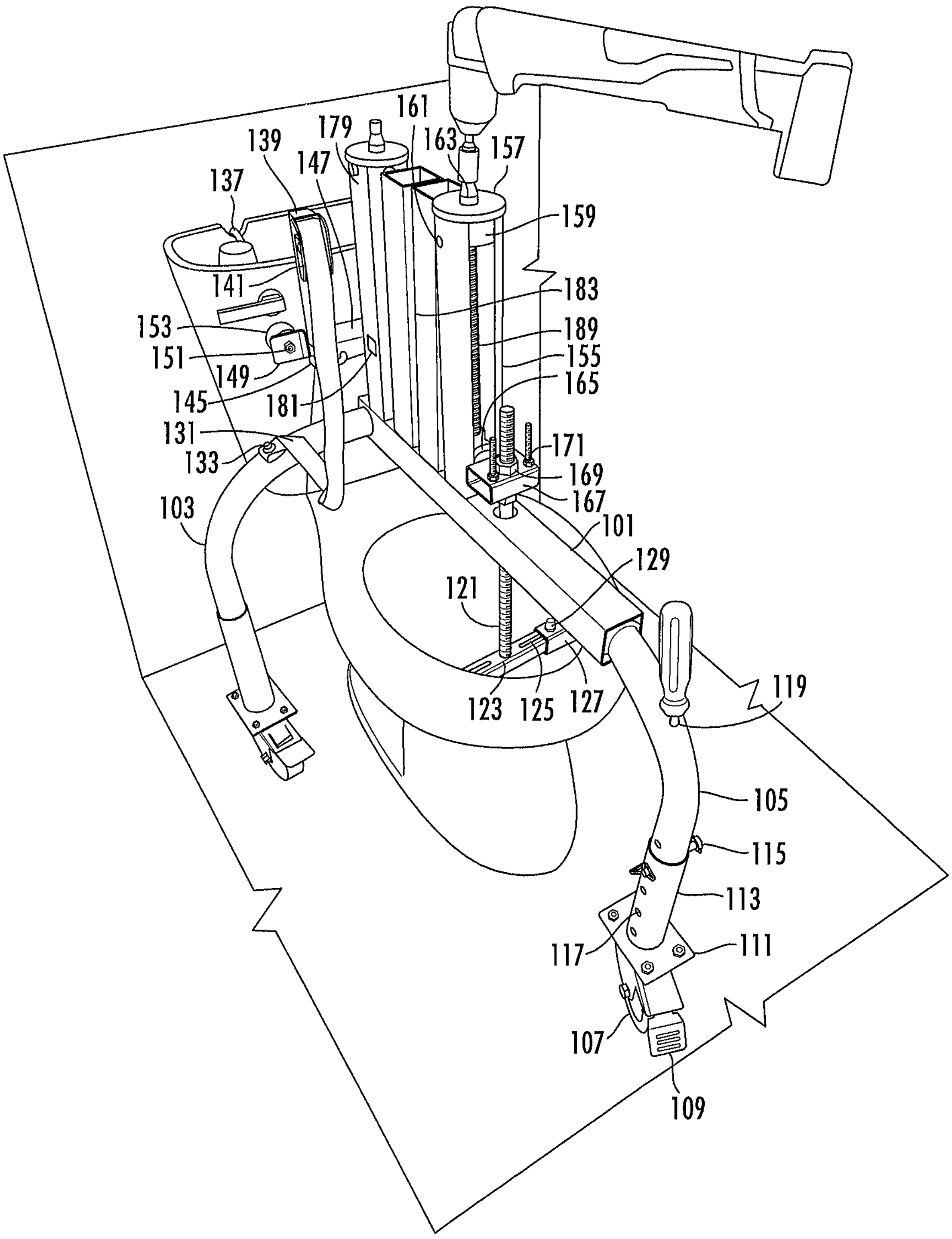
FIG. 2A is a perspective view of the toilet hoist of FIG. 1A with a toilet attached according to a preferred embodiment of the present invention.
Figure 2B:
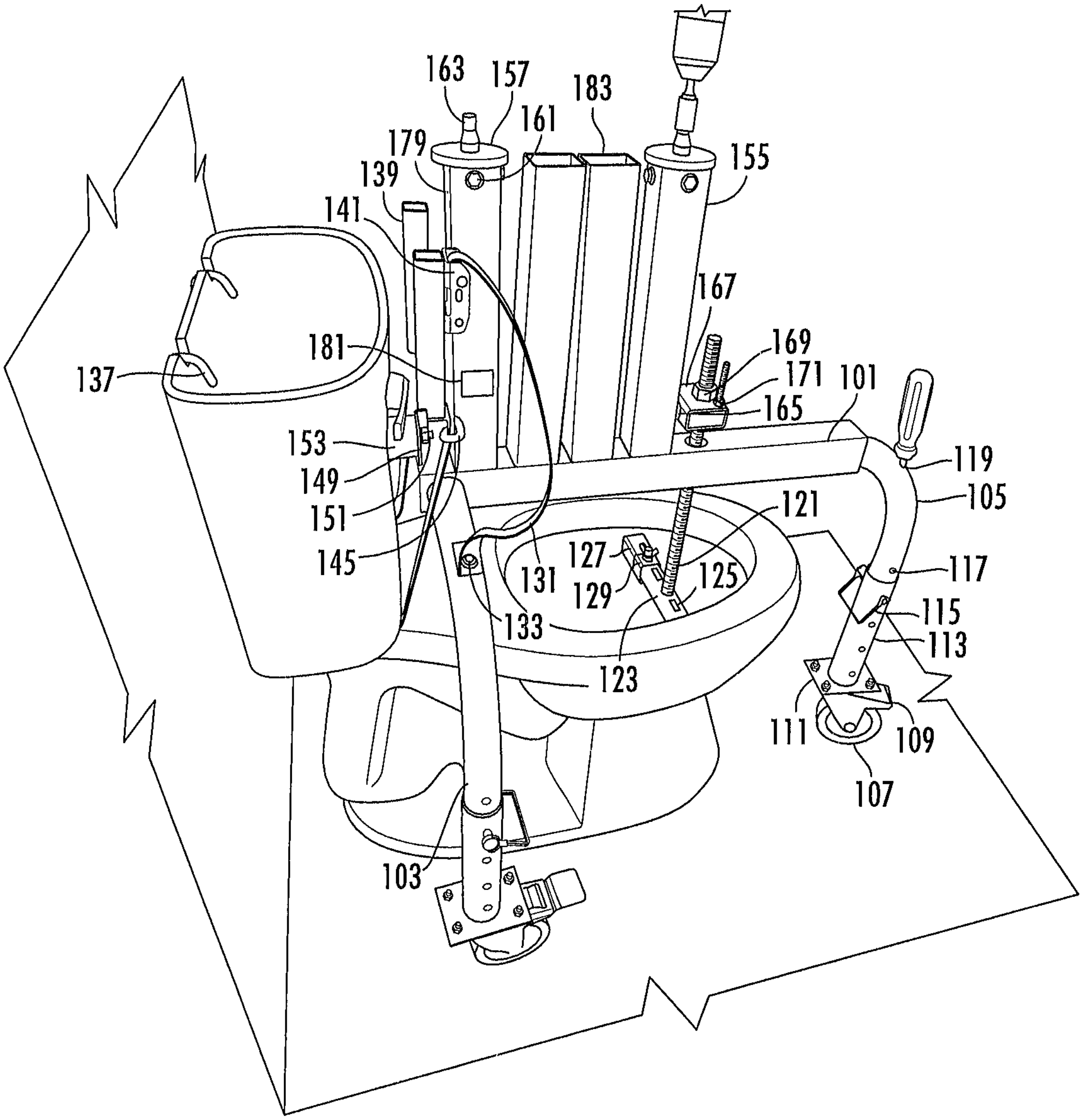
FIG. 2B is a perspective view of the toilet hoist and toilet of FIG. 2A.
Figure 2C:
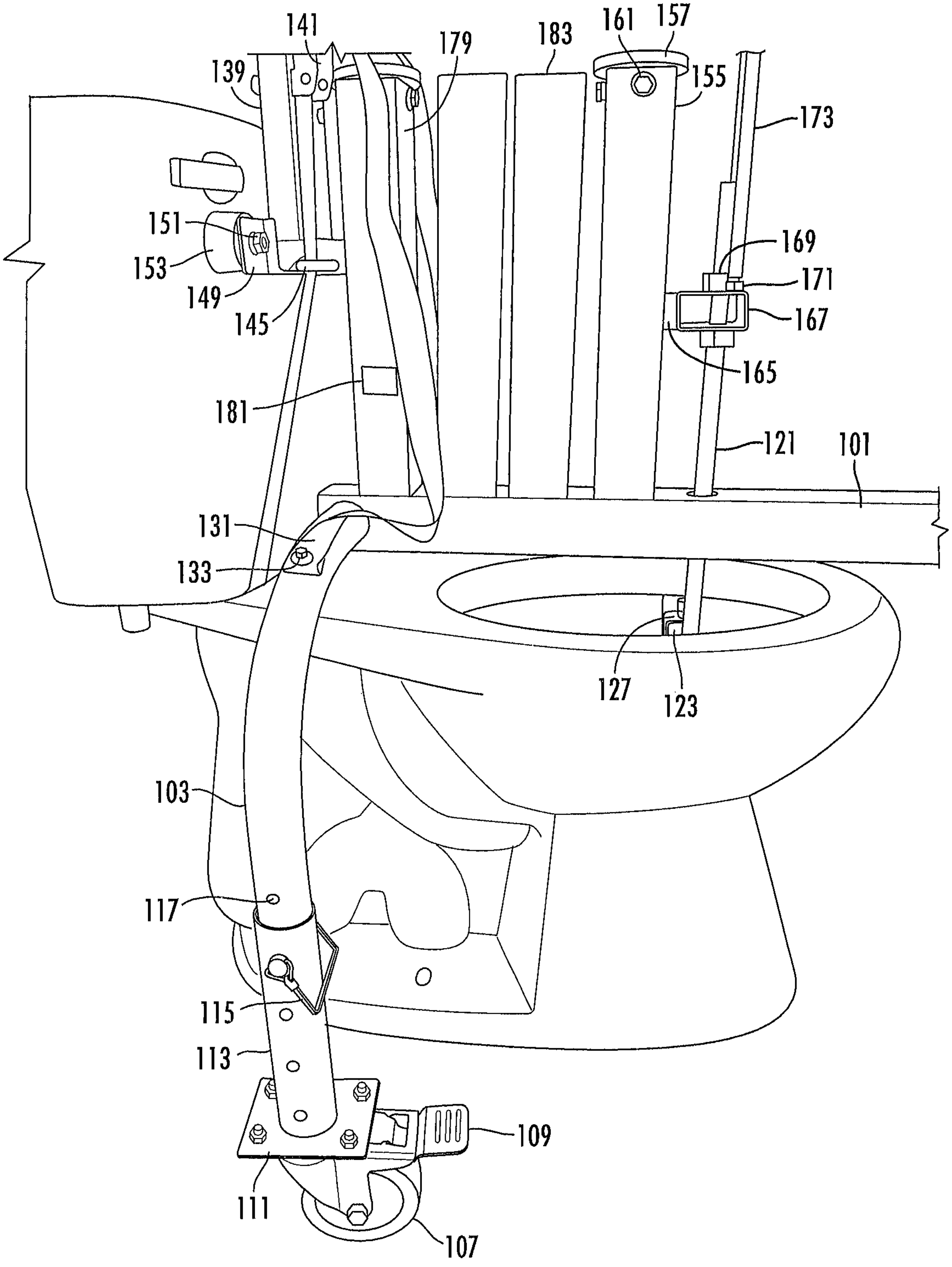
FIG. 2C is a partial side view of the toilet hoist and toilet of FIG. 2A.
Figure 2D:
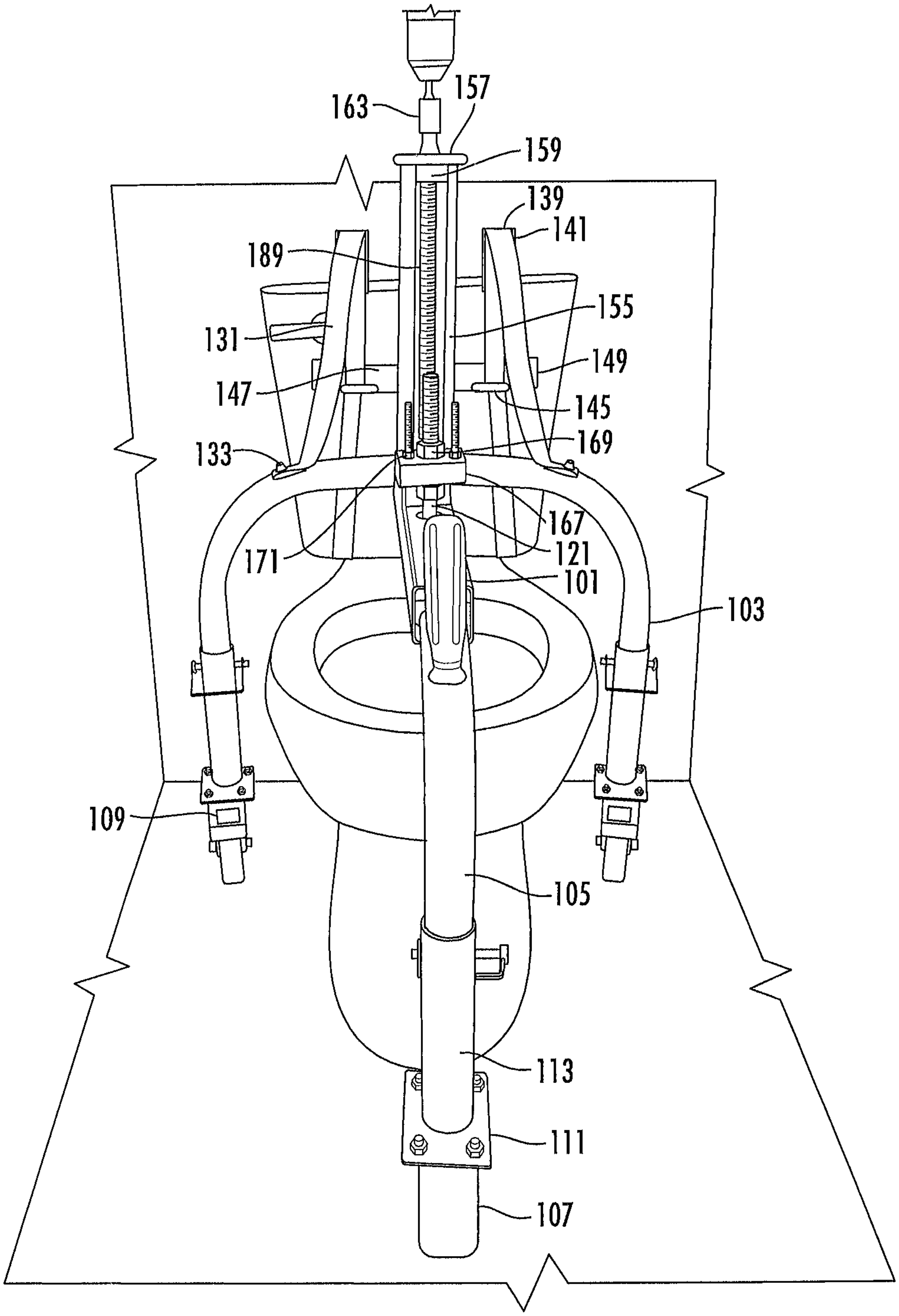
FIG. 2D is a front view of the toilet hoist and toilet of FIG. 2A.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of a system of a toilet hoist and the method on its use are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time consuming, but would nevertheless be a routine undertaking for those of ordinary skill in the art having the benefit of this disclosure.

An improved toilet hoist is configured to keep a toilet aloft during the installation phase. The toilet hoist of the present application allows for greater maneuverability of a toilet while the toilet is suspended leading to easy alignment for quick and efficient installation, also greatly reducing the level of physical exertion required to move the toilet. Efficient installation through the present process increases the chance that toilets will be properly installed and greatly decreases the likelihood of injury to the installer.

Referring now to Figured 1A-1E in the drawings, various views of a toilet hoist are illustrated according to a preferred embodiment of the present invention. Toilet hoist 100 preferably includes base 101, rear legs 103, and front leg 105. Base 101 is preferably a hollow rectangular shape, but alternative embodiments may vary in shape and material, which may also be solid instead of hollow. Rear legs 103 protrude substantially perpendicular to base 101 and arc in a downward direction. Front leg 105 preferably extends from an end of base 101 and also arcs downward. Like the base 101, legs 103/105 are preferably hollow, but may be solid depending on material choice. Under the preferred embodiment, the hollow material reduces total weight of the system; however, it should be appreciated that although weight reduction is important, the material does need proper strength so as to maintain stability of the system during installation. Although the preferred embodiment includes three total legs, it should be appreciated that alternative embodiments of the present invention may have additional legs to promote increased stability.

Front leg 105 also preferably includes an aperture 119 disposed on an upper surface of the leg. Aperture 119 is configured as a storage location to fit a variety of tools that are common in toilet installation, such as screwdrivers or wrenches. Some embodiments of the present invention do not require aperture 119.

Each leg 103/105 preferably includes a connecting cylinder 113 near the base of the leg. Each connecting cylinder 113 is hollow and has a radius slightly larger than the legs 103/105, such that when legs 103/105 are inserted into connecting cylinder 113, there is a secure fit. Each leg 103/105 and connecting cylinder 113 includes a row of circular apertures 117, the apertures 117 preferably being arranged in a straight line running vertically up the leg. Fastener bar 115 is operably associated with apertures 117, such that the selected position of fastener bar 115 within the apertures determines the height of each leg. Such configuration allows for variation in height of the system, and therefore allows for use with many varying sizes of toilets.

Under the preferred embodiment, at the bottom of each leg is a wheel system. Each wheel system preferably includes a caster base 111, caster 110, fasteners 112, wheel 107, axle fastener 108, and wheel lock 109. Caster base 111 is used to couple connecting cylinder 113 to caster 110 using fasteners 112. It should be appreciated that some alternative embodiments of the present invention may secure the caster 110 to the connecting cylinder 113, or otherwise to the legs in a different manner, such as by welding or other securement methods.

Caster 110 attaches to wheel 107 using axle fastener 108, which is positioned through the center of wheel 107. Caster 110 allows for the wheel 107 to move omnidirectional when in use allowing for easy movement of toilet hoist 100. Caster 110 also has wheel lock 109 which is used to lock wheel 107 in place when it is in a locked position or allow for movement when in the up unlocked position. Locking wheel 107 in place keeps toilet hoist 100 secure during the installation process, which decreases the chance of a mistake or injury because of unwanted movement.

Front tower 155 and back tower 179 are preferably disposed on top of base 101, extending vertically upward. Under the preferred embodiment, towers 155/179 are secured to base 101 by welding; however, alternative methods of attachment may be used, such as bolts or other fasteners. Support pieces 183 are disposed between the towers 155/179 and are removeable. Support pieces 183 are preferably configured to be capable of supporting the weight and size of a variety of toilets, such that the support pieces 183 can be removed from base 101 and placed underneath a toilet to maintain its height above the ground during installation even when it may become necessary to remove the toilet from the hoist.

Under the preferred embodiment, each tower 155/179 has a rotating cap disposed on the top, secured to the top using fasteners 161. Each rotating cap includes a cap head 157, an inner base 159, and a rotational head 163. Rotational head 163 extends through cap head 157 and into inner base 159, and then reaches a connection point with a screw disposed within each tower. Front tower 155 includes front tower screw 189, which is operably associated with the rotational head 163, such that rotation of the rotational head causes rotation of the tower screw 189. The tower screws of the present invention are preferably acme threaded drive screws; however, it should be appreciated that a variety of devices utilized for driving motion may be used to achieve the outcomes desired by use of the present invention.

Front tower 155 preferably has an opening 156 facing the direction of front leg 105. Opening 156 runs a substantial portion of the height of tower 155; the opening 156 provides a viewing and maintenance point into tower 155 which gives easy access to base 159 and tower screw 189. However, it should be appreciated that some embodiments of the present invention may have an opening with different proportions in place of opening 156. Rotational head 163 can be actuated using a variety of powered devices or hand tools, such as power drills, wrenches, or other similar components. Under the preferred embodiment, rotation of the tower screw 189 causes upward or downward movement of any object attached to tower screw 189, depending on rotational direction.

A support mechanism is preferably connected to tower screw 189, the support mechanism includes tower connector 165 and support base 167. Tower connector 165 preferably is slotted on one side to accommodate for the insertion of tower screw 189. The inside of tower connector 165 is grooved in a pattern associated with the operation of tower screw 189. On the opposing side of tower connector 165 to the slotted side is a rectangular block of material that is preferably hollow. The rectangular block is used to support the toilet securing mechanisms when the system is in use.

Under the preferred embodiment, there are two mounting screws 171 disposed on a top surface of base 167. Mounting screws 171 are configured to hold guide pins 173 when the guide pins are not being used. During installation of a toilet, there are fasteners inserted through side holes in the base of the toilet. Guide pins 173 may be removed from mounting screws 171 and placed over the fasteners to ease the installation process by helping to guide the toilet into place. Under the preferred embodiment, guide pins 173 have a wire 177 attaching the pins to the system. Wire loops 175 are on one end of the wire, configured to securely hold guide pins 173; on the opposing end of the wire 177 is an attachment to the base 101 at wire point 191. Attaching wire 177 to base 101 helps prevent the guide pins 173 from being lost. It should be understood that the guide pins 173 are optional and may not be present in every embodiment of the present invention, and further that even if guide pins 173 are present, the wire 177 are also optional.

Fastener 169 is preferably disposed on a top surface of base 167, the fastener 169 being configured to secure support screw 121 to base 167. Support screw 121 extends through base 167 and through a hole 120 in base 101. Support bar 123 is preferably disposed under base 101 and connected to a bottom portion of support screw 121. Under the preferred embodiment, support bar 123 is a T-bar extending out perpendicularly relative to base 101. Support bar 123 is preferably hollow, yet rigid enough to aid in supporting the weight of a toilet, as the support bar 123 is utilized to help lift the toilet via the inner lip of the toilet bowl. Padded supports 127 are disposed on each horizontal end of support bar 123, the padded supports 127 configured to snugly fit over support bar 123 to help prevent damage to the toilet bowl during the installation process.

On a top surface of support bar 123 are slots 125 running the length of support bar 123. Slots 125 are used in connection with the padded supports 127 to adjust exact positioning of the padded supports 127. Each support 127 may be positioned at varying distances from the center of support bar 123 depending on the size of the toilet bowl that is being moved. Fasteners 129 are used to secure padded supports 127 in the desired position. Although the support bar 123 is shown as being a horizontally positioned T-bar, it should be appreciated that alternative embodiments of the present invention may include support systems that are a variety of elements. For example, the support system could be a single pad, a single or series of hooks, straps, or a variety of other pieces that can be used to connect to and support a toilet bowl.

Back tower 179 is preferably configured to function similar to front tower 155. Although similar, back tower does include subtle differences, such as starting indicator 181. Indicator 181 is configured to show where the ideal starting position is for support base 147. Support base 147 is preferably configured to function like support base 167, the support base 147 being connected to tower screw 185 by connector 187.

Support towers 139 are preferably disposed on a top surface of support base 147. Support towers 139 are configured to support straps 131; however, it should be appreciated that in some alternative embodiments where there may not be straps present, the support towers may not be needed and thus would not be present. In such embodiments without straps 131, there will be some type of supporting member to aid in lifting the toilet. For example, individual or combinations of hooks, pins, clamps, or other devices for gripping the toilet may be utilized.

Additionally, support base 147 preferably has support plates 149 attached, which are configured to support cushions 153. Under the preferred embodiment, the cushions 153 are configured in a way so as to prevent the toilet from hitting the hoist 100 during the installation process, thus preventing damage to the toilet. It should be appreciated that some alternative embodiments of the present invention do not have cushions and thus would not have the support plates, and further that some embodiments may include alternatively shaped and sized cushions in various numbers.

Under the preferred embodiment, a toilet is secured to the toilet hoist 100 using straps 131 during installation. Straps 131 are attached to rear legs 103 using fastener 133; straps 131 are further secured to support towers 139 via loop 145, which is attached to the side of support base 147. Fastening clip 141 is configured to control elements of strap 131, such as the usable length and tension of the strap. Clip tab 143 is preferably a release tab disposed on fastening clip 141 for purposes of releasing clip 141 and allowing more of strap 131 to be useable and also altering the tension of the strap 131.

Strap 131 further includes a strap hoop 135 configured to be placed on hook 137. During the installation process, the strap 131 is placed under the tank of a toilet and then up the back of the toilet, where the hook 137 is then secured to the tank of the toilet. The strap and hook combination increases stability of the system and aids in lifting of the toilet during installation. When the hook 137 is not secured to a toilet, it may be placed into a storage position by hooking onto the top support towers 139, which preferably have a hollow portion capable of supporting hook 137.

Referring now also to FIGS. 2A-2D in the drawings, a toilet hoist is illustrated according to a preferred embodiment of the present invention. FIGS. 2A-2D best illustrate the toilet hoist 100 carrying a toilet for installation purposes. A preferred toilet installation method utilizing the toilet hoist 100 includes the steps described below.

First, a toilet set for installation or removal is preferably positioned in a flat location, and the toilet hoist 100 is positioned near the toilet for setup. The legs 103/105 may need to be raised or lowered using connecting cylinder 113 and fastener bar 115 to reach and set a desired height for the toilet being moved. Rotational head 163 on back tower 179 may need to be rotated such that support base 147 is in a proper starting position being aligned with indicator 181.

Following the initial setup, toilet hoist 100 is moved to a position over top of and around the toilet to begin the movement process. Toilet hoist 100 is moved from the front of the toilet toward the back until cushions 153 contact the front of the toilet tank. Once in place over the toilet, wheels 107 should be secured by moving wheel lock 109 into a locked position such that there is not unnecessary or unwanted movement while securing the toilet to the hoist.

Once the wheels are locked, straps 131 are moved under the tank of the toilet then up the back of the toilet tank and then hooks 137 are hooked onto the top lip of the toilet tank. As illustrated, it is preferred that the hooks 137 are positioned on grooves of the top lip of the toilet tank, but it should be understood that some embodiments may include alternative securement methods, and also that some toilets may not have said grooves. Once the hook 137, or other securement mechanism, is secured the clip tab 145 of fastening clip 143 is engaged such that any excess length of strap 131 is pulled through clip 143 until the desired strap tension is met. Once the desired tension is reached, the clip tab 145 is disengaged so that the straps are secured around the back of the toilet.

Following securement of the back of the toilet, the front of the toilet is set to be secured. The padded supports 127 of support bar 123 should be positioned in a location such that the support bar 123 can fit into the toilet bowl. Tower screw 189 is then rotated using rotational head 163 of front tower 155, such that the support bar 123 is lowered into the toilet bowl. Once support bar 123 has been lowered into the toilet bowl, padded supports 127 are extended outwards to a desired length such that the supports are positioned to catch the lip of the toilet bowl when lifted. As described above, fasteners 129 are used to secure the supports 127 in place.

Following securement of the front and back portions of the toilet to toilet hoist 100, the lifting of the toilet then occurs. Under the preferred embodiment, a user of the system will actuate lifting of the toilet using a powered device, such as a drill or other motorized device. It should be understood that some alternative embodiments of the present invention may have further manual actuation, such as with a wrench or ratchet. The powered device is used to rotate rotational head 163 on towers 155/179. Rotating each individual rotational head 163 will cause the corresponding screw within the tower to rotate and vertically move the corresponding support base, thus raising the toilet from the ground. If rotating each head 163 individually, it is preferable that short rotational bursts of the powered device are utilized while switching back and forth between the towers to minimize undue strain on an individual side. The lifting process is continued until the toilet is at a desired height, which is generally a selected height above the standard height of the floor fasteners of the toilet.

It should be appreciated that the powered device associated with operation of the hoist may take on a variety of forms. For example, the power system could be a drill, as illustrated; further, the system could integrate any form of power for system operation, the operation being controlled hydraulically, electrically, mechanically, pneumatically, or through some combination of such methods.

Once a selected height of the toilet is reached, the wheels should be unlocked to allow for rolling movement of the system. The system is then moved to a desired position, which is generally a toilet flange location. The toilet hoist 100 is positioned such that the holes in the base of the toilet are directly lined up with the corresponding fasteners protruding up from the flange. Once properly positioned, the wheels can then be locked again to minimize unwanted movement away from the final position. The guide pins 173 may be inserted through the toilet base holes, such that extra guiding support occurs during the positioning process. With guide pins 173 in place, the operator can then begin the process of lowering the toilet in place using the same method used to lift the toilet, but using the opposite rotational direction such that the screws in the tower move the support bases down instead of up. During this process, the operator needs to make sure that guide pins 173 stay in the up position so that they know they are correctly installing the toilet over the flange.

After the toilet is lowered into place, the toilet is removed from toilet hoist 100. The above steps for attaching the toilet to toilet hoist 100 will essentially be reversed for removing the toilet hoist 100. Straps 131 should be unhooked from the toilet tank and removed from the tank, such that they are no longer supporting the toilet. Support bar 123 should be removed from the toilet bowl and positioned such that it does not interfere with the toilet when the hoist is moved. The wheel locks 109 should then be moved to an unlocked position and the toilet hoist 100 should be moved away from the toilet, and any remaining steps of installation, such as tightening fasteners, can be completed.

Figure 3:
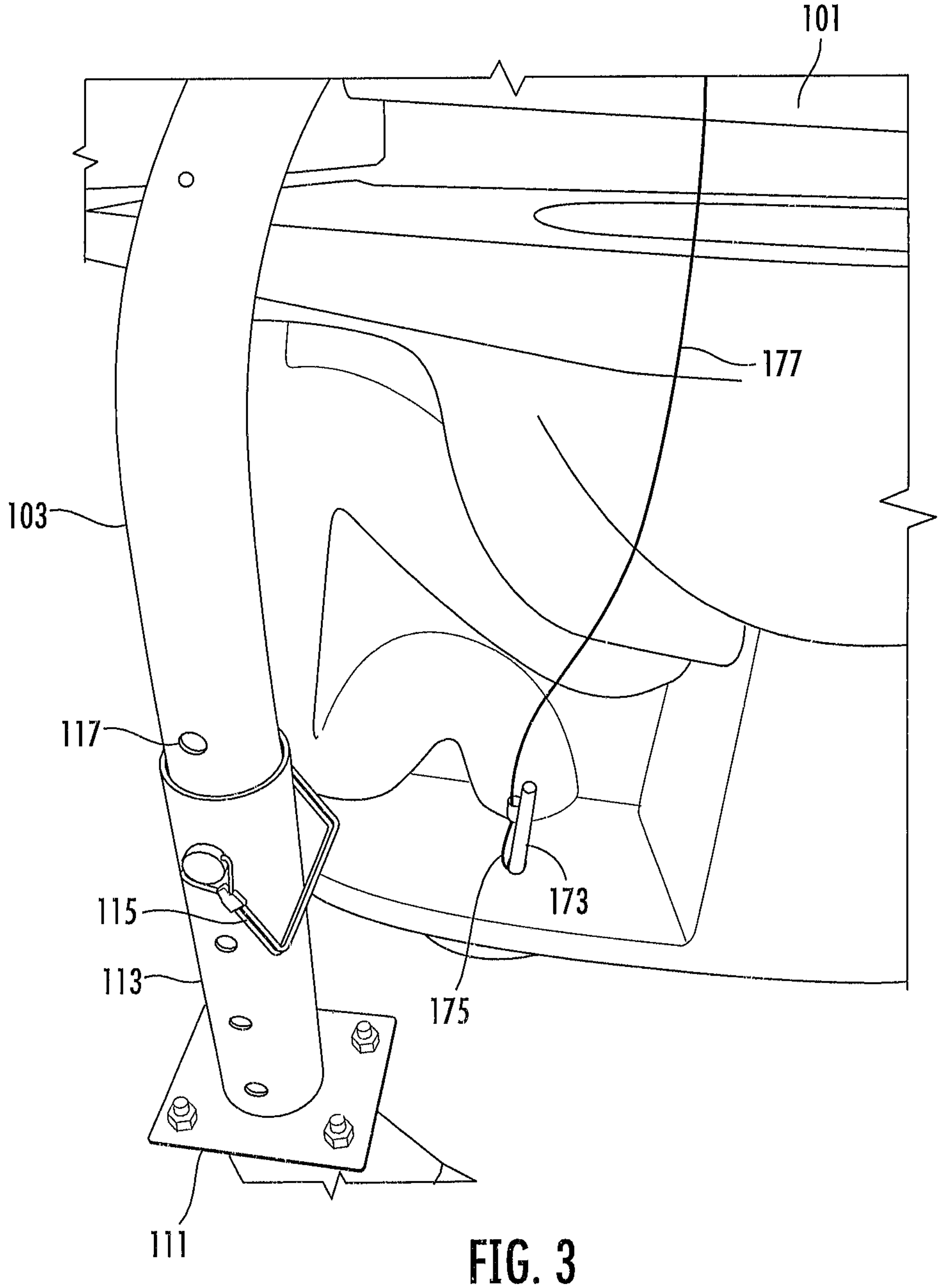
FIG. 3 is a partial perspective view of the toilet hoist and toilet of FIG. 2A.
Figure 4:
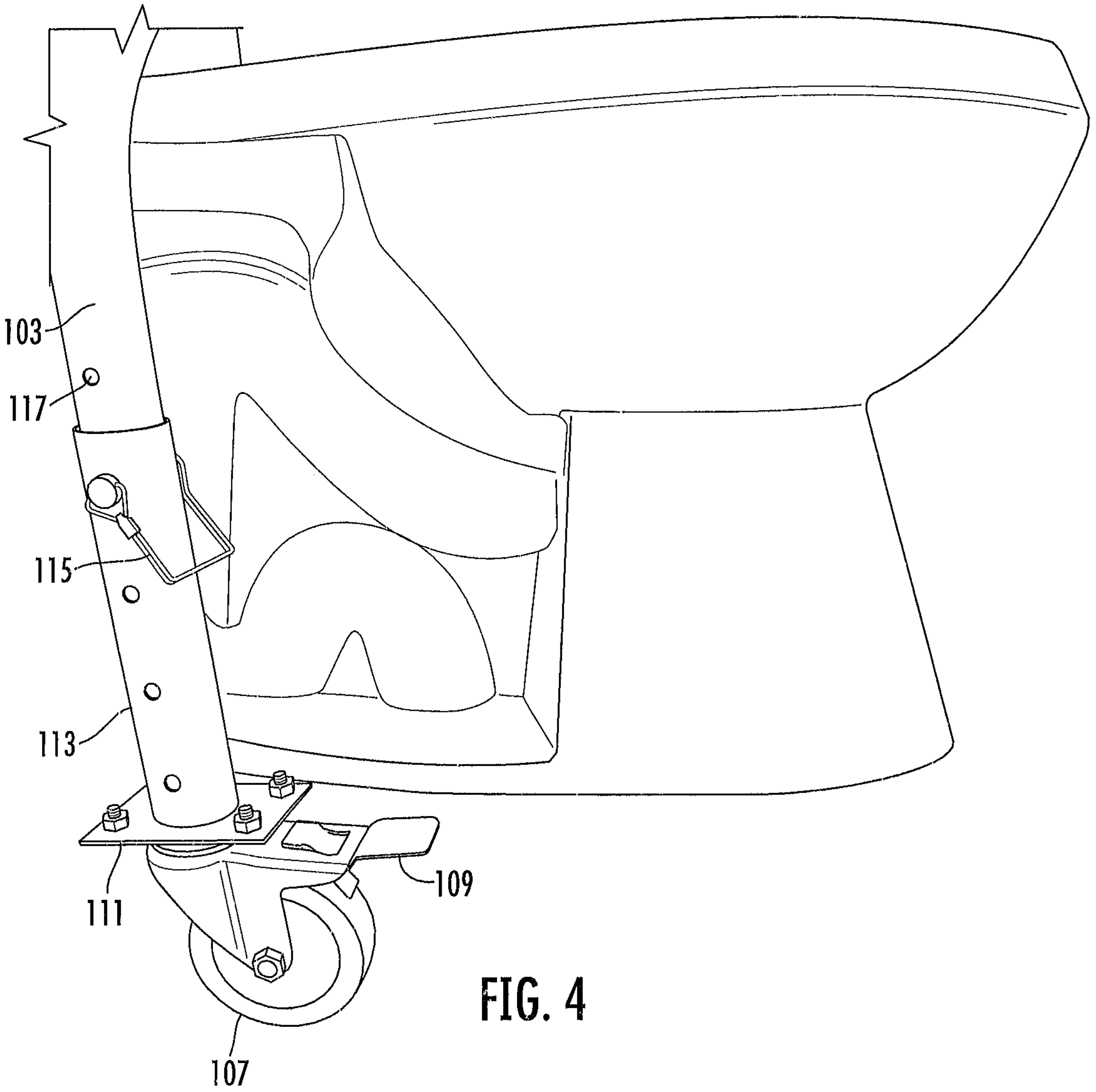
FIG. 4 is a partial side view of the toilet hoist and toilet of FIG. 2A.

Referring now also to FIGS. 3 and 4 in the drawings, a partial view of a toilet during installation using the toilet hoist 100 is illustrated. FIG. 3 best illustrates the preferred function of guide pins 173, as described above relating to the installation of a toilet. It should be appreciated that the length of guide pins may vary in alternative embodiments of the present invention. FIG. 4 best illustrates a close-up view of the preferred structure of the wheel 107 and how is connects to each leg. Further, FIG. 4 gives a view of the toilet suspended above the ground during the installation process.

Figure 5A:
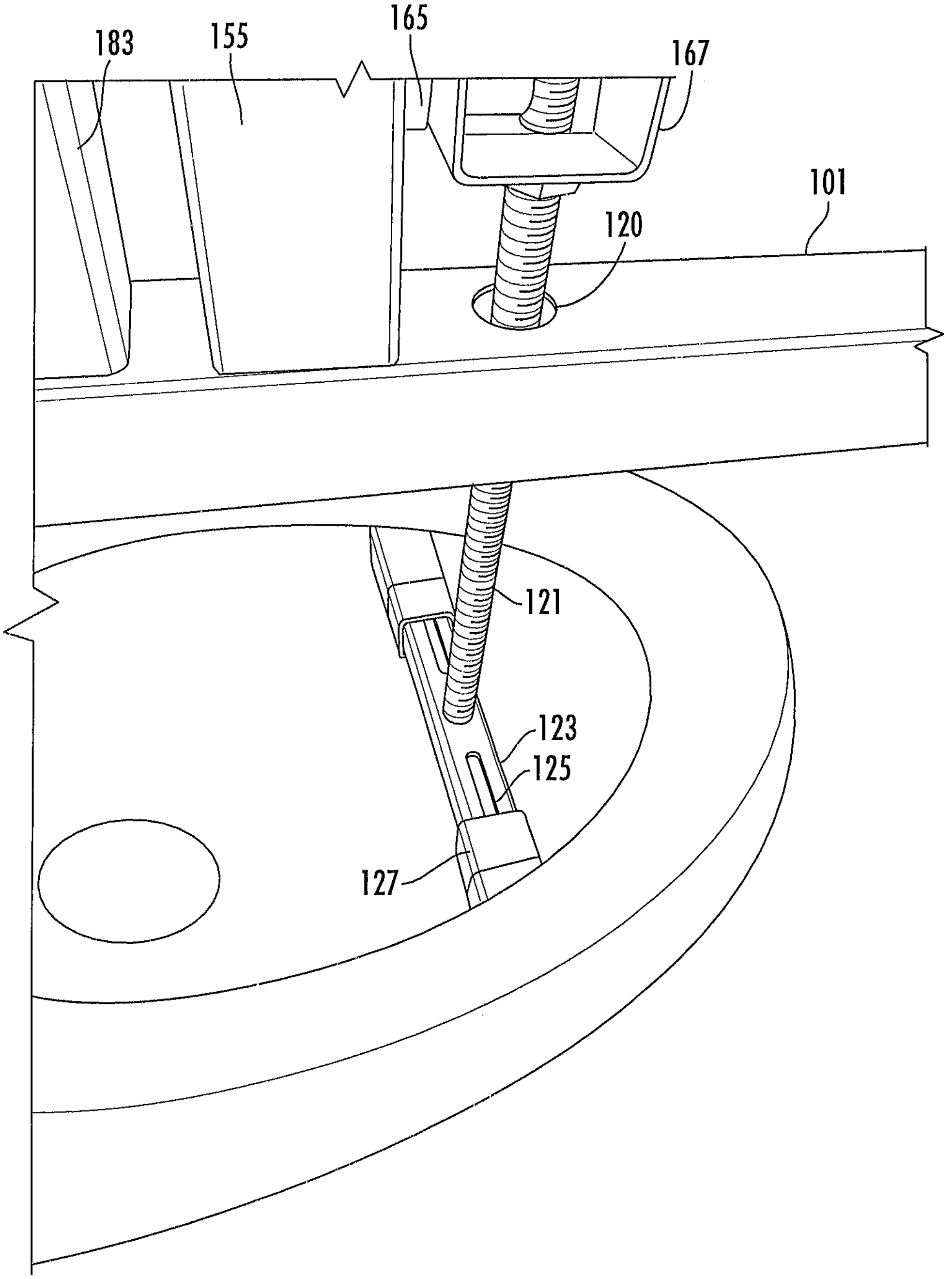
FIG. 5A is a partial perspective view of the toilet hoist and toilet of FIG. 2A.
Figure 5B:
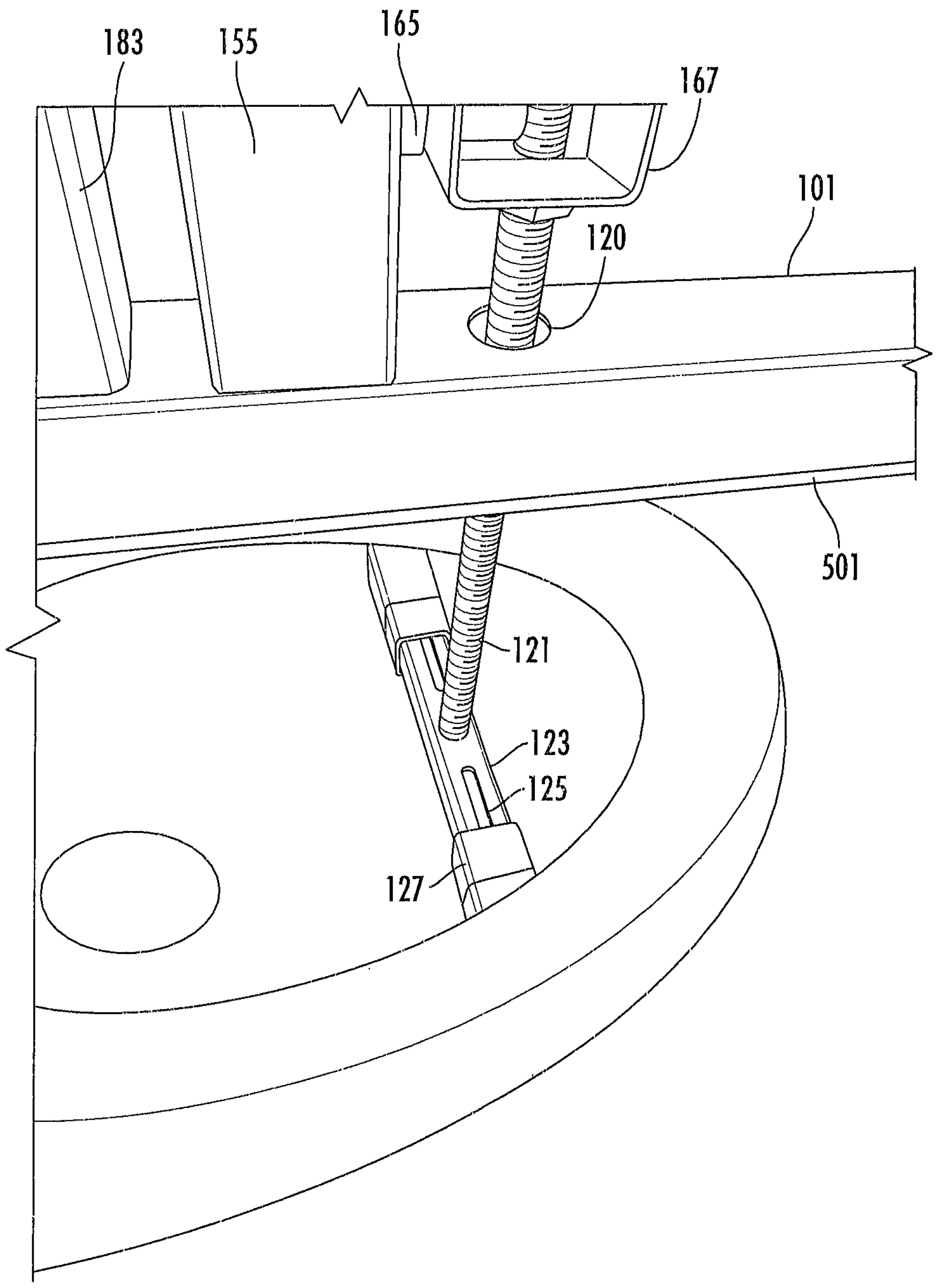
FIG. 5B is a partial perspective view of the toilet hoist and toilet of FIG. 2A.

Referring now also to FIGS. 5A and 5B in the drawings, a partial view of a toilet during the installation process using the toilet hoist 100 is illustrated. FIG. 5A best illustrates the preferred use of support bar 123, which is in an extended position meeting the lip of the toilet bowl for purposes of lifting the toilet.

FIG. 5B is an alternative embodiment of toilet hoist 100 which includes pad 501 attached to the underside of base 101. Pad 501 is used as a safety measure to prevent potential damage to the toilet during installation. If the toilet is lifted too suddenly, the lip of the toilet will not slam into the underside of base 101; instead, pad 501 is in place to prevent this potential damage to the toilet during the installation process. Although shown as a piece of material running the length of base 101, it should be appreciated that the pad may take on a variety of shapes and sizes. For example, there may be a plurality of individual pads positioned in several places, such as the specific portions of base 101 that would be contacted by a toilet when raised.

Figure 6:
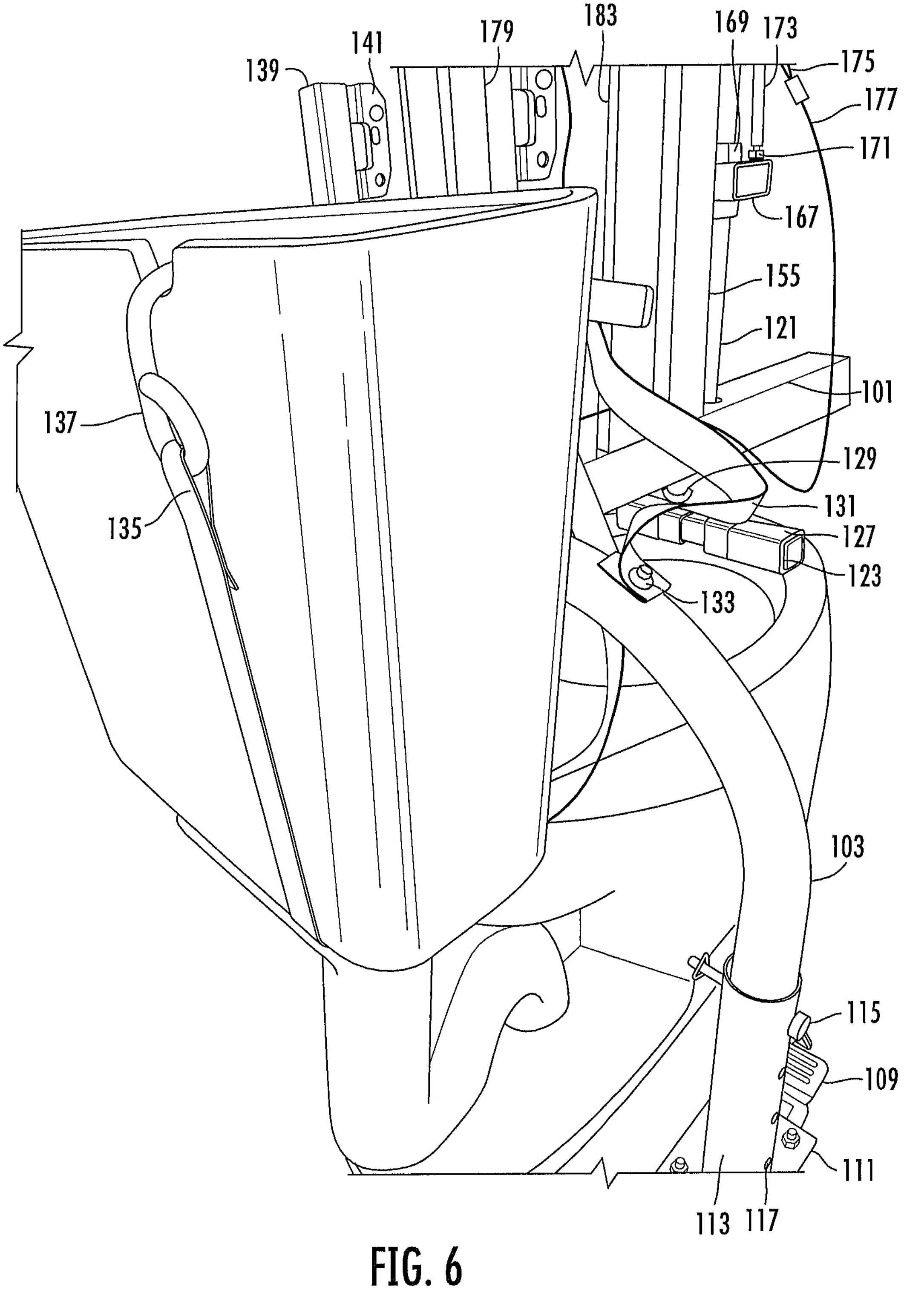
FIG. 6 is a partial perspective view of the toilet hoist and toilet of FIG. 2A.
Figure 7:
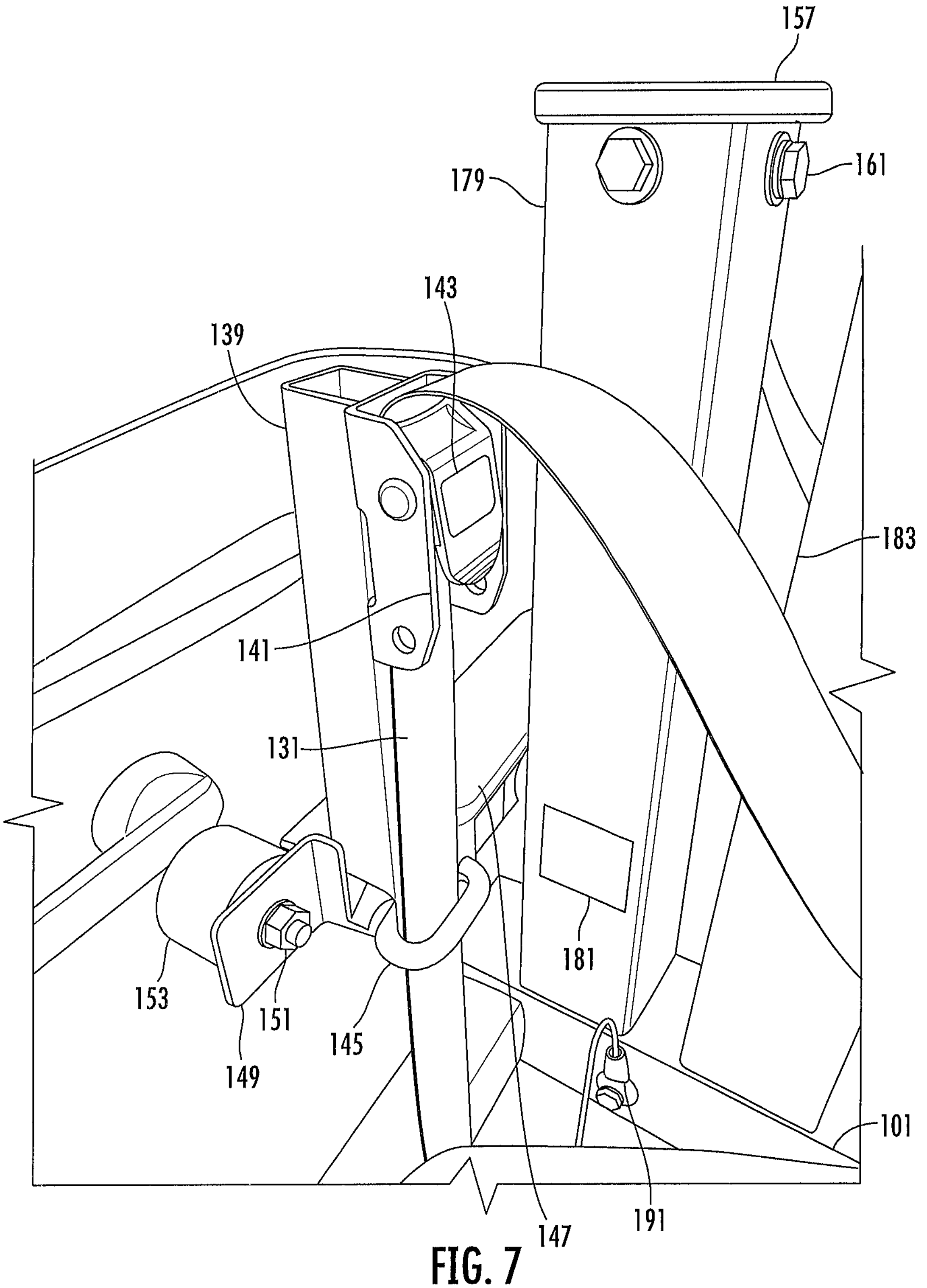
FIG. 7 is a partial perspective view of the toilet hoist and toilet of FIG. 2A.

Referring now also to FIGS. 6 and 7 in the drawings, a partial view of a toilet during installation is illustrated. FIG. 6 best illustrates the preferred combination of straps 131 and hook 137 being utilized to secure a toilet to the toilet hoist 100. FIG. 7 best illustrates the preferred configuration of fastening clip 141 and its use with straps 131.

Figure 8:
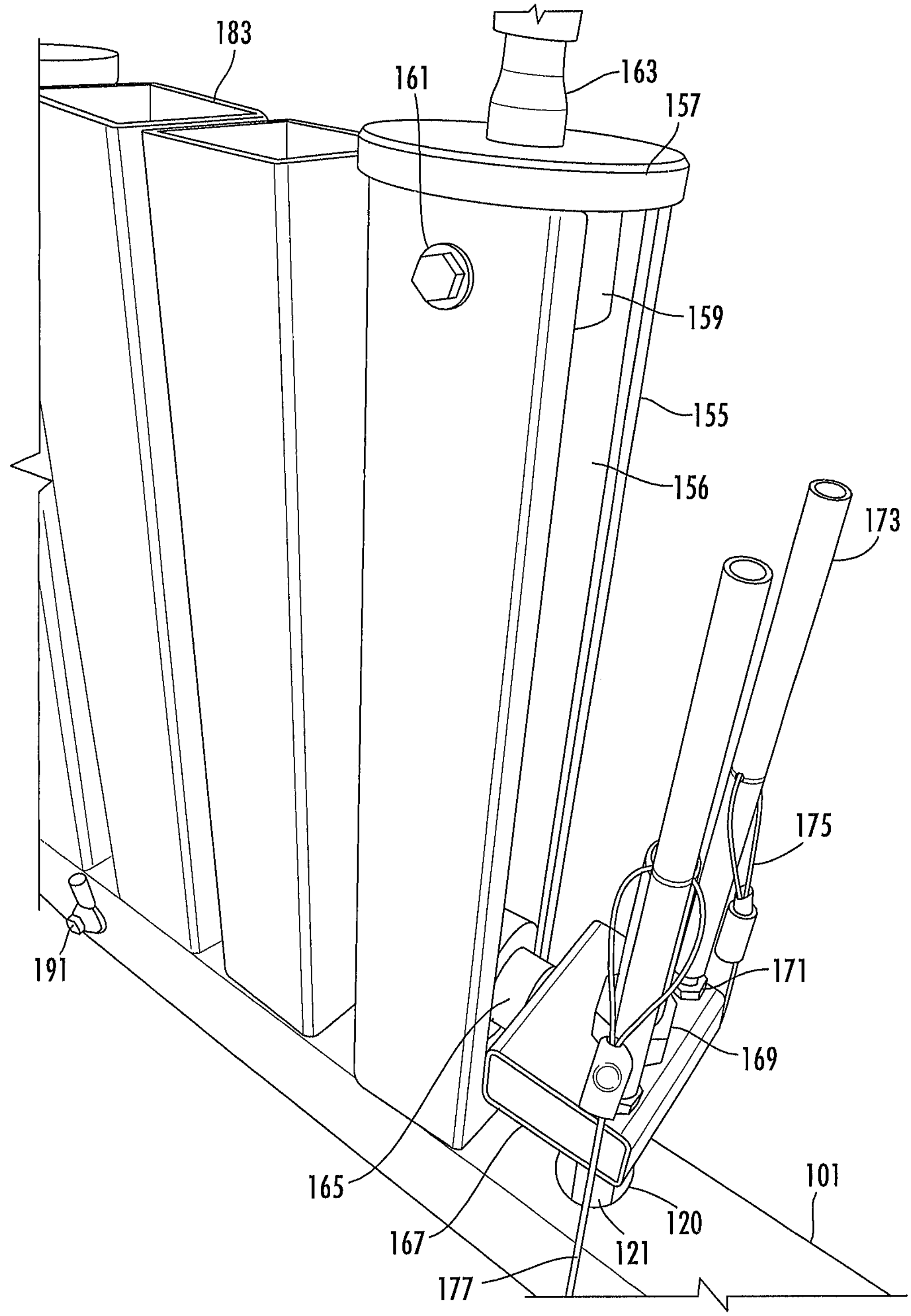
FIG. 8 is a partial perspective view of the toilet hoist and toilet of FIG. 2A.

Referring now also to FIG. 8 in the drawings, a partial view of toilet hoist 100 is illustrated. FIG. 8 best illustrates the preferred configuration of front tower 155. The cap head 157 is shown in substantial detail with inner base 159 shown seated within the tower 155. FIG. 8 also shows how connector 165 and base 167 interact and are capable of sliding vertically within the tower 155.

Figure 9A:
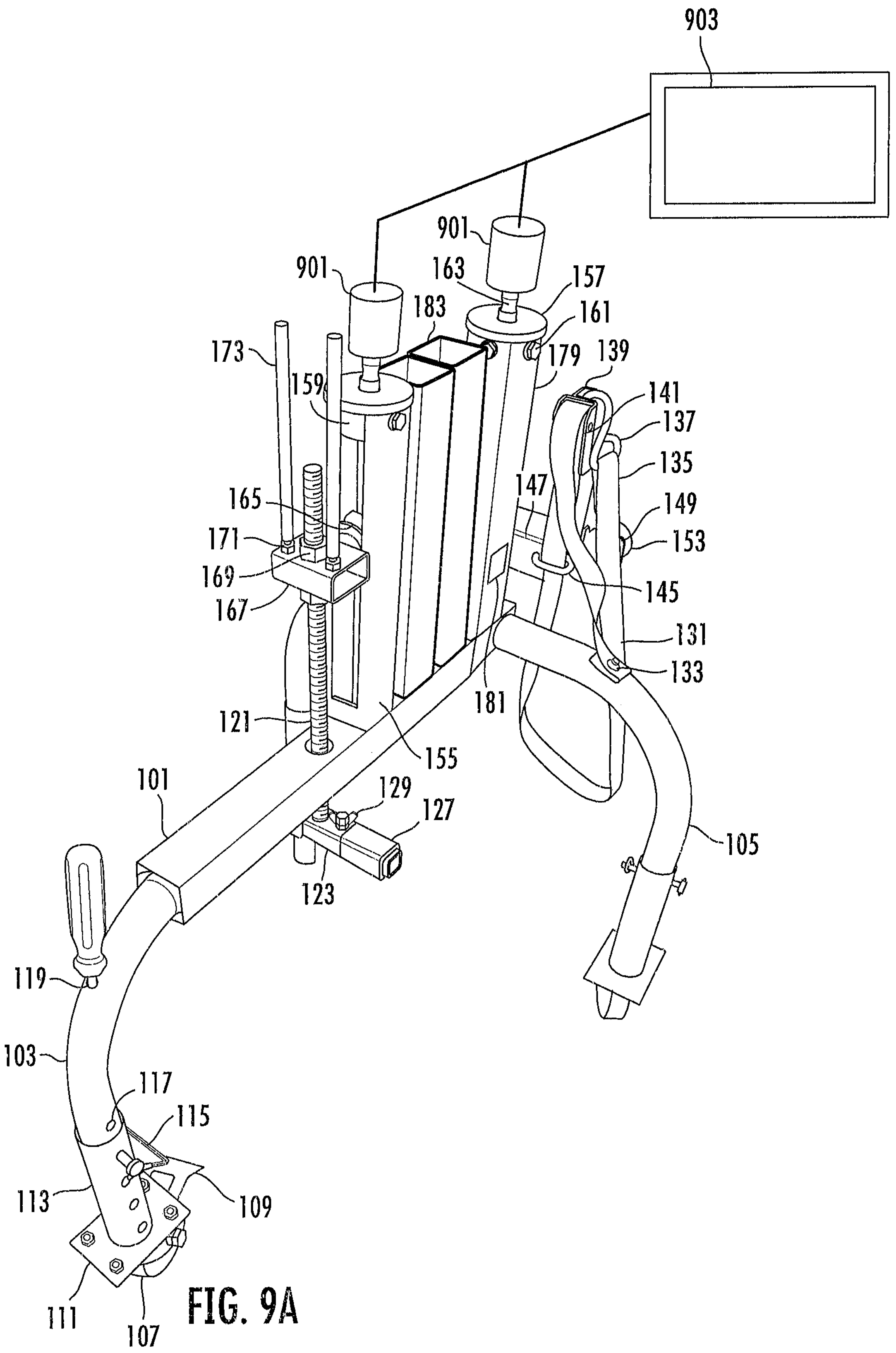
FIG. 9A is a perspective view of a toilet hoist according to an alternative embodiment of the present invention.
Figure 9B:
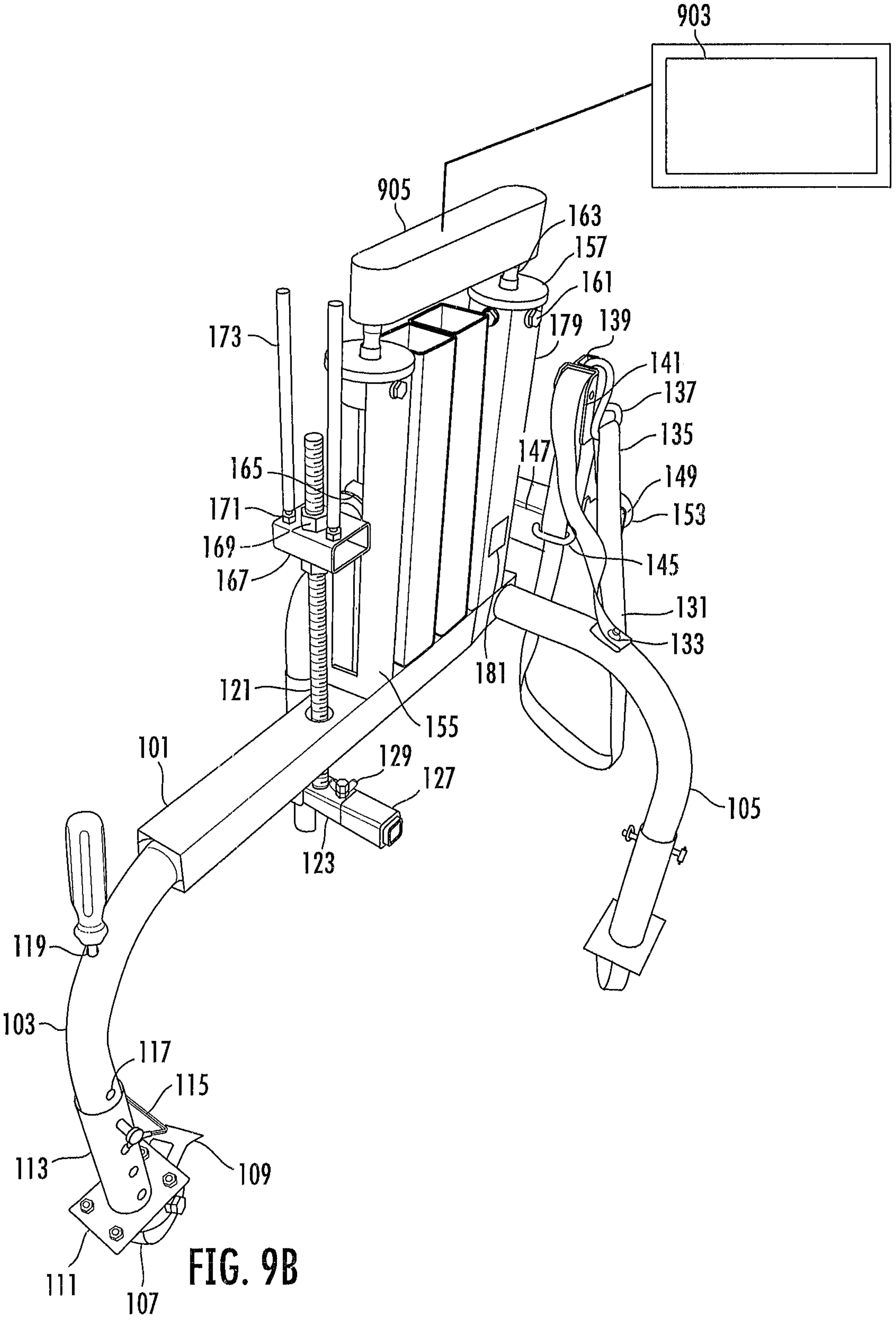
FIG. 9B is a perspective view of a toilet hoist according to an alternative embodiment of the present invention.

Referring now also to FIGS. 9A and 9B in the drawings, perspective views of a toilet hoist are illustrated according to alternative embodiments of the present invention. The toilet hoists illustrated in FIGS. 9A and 9B are substantially similar to the toilet hoist shown in FIG. 1A. However, instead of being driven by a drill or similar device, the toilet hoists of FIGS. 9A and 9B are motor driven. FIG. 9A best illustrates an alternative embodiment with two independent drive motors 901, each being disposed on top of the front and back tower, respectively. FIG. 9B best illustrates an alternative embodiment that includes an individual drive motor 905 that is operably associated with both the front and back tower operation. Further included with the alternative embodiments shown in FIGS. 9A and 9B is device 903. Device 903 is preferably configured to operate motors 901 or motor 905. Device 903 may be a smart device or other device capable of communicating, by wire or wirelessly, to drive the motors. It should be appreciated that device 903 may be located anywhere, such as being a separate mobile device, a device mounted or otherwise attached to the system at a selected location, or anywhere else where the device remains operably associated with the system. It should be further appreciated that alternative embodiments may include various methods of driving the motors, such as switches, push buttons, or other actuating devices. In some embodiments, there may be limit switches, stops, or sensors configured for automatically controlling operation of the motors. Such switches, auto stops, and sensors may be located in a plurality of positions on the system, and they preferably operate to prevent slamming of a toilet into the hoist.

Although motors 901/905 as shown being located on a top surface of the system to drive the screws, it should be understood and appreciated that motors may be located in alternative positions in some alternative embodiments of the present invention. For example, the motors may drive the system from the bottom of screws instead of the top. Further, there may be an embodiment with motors operably associated with the legs of the hoist 100. In such embodiment, actuation of the motors would raise or lower the legs relative to the toilet, and thus would change the position of the toilet by changing the height of the hoist holding the toilet.

Figure 9C:
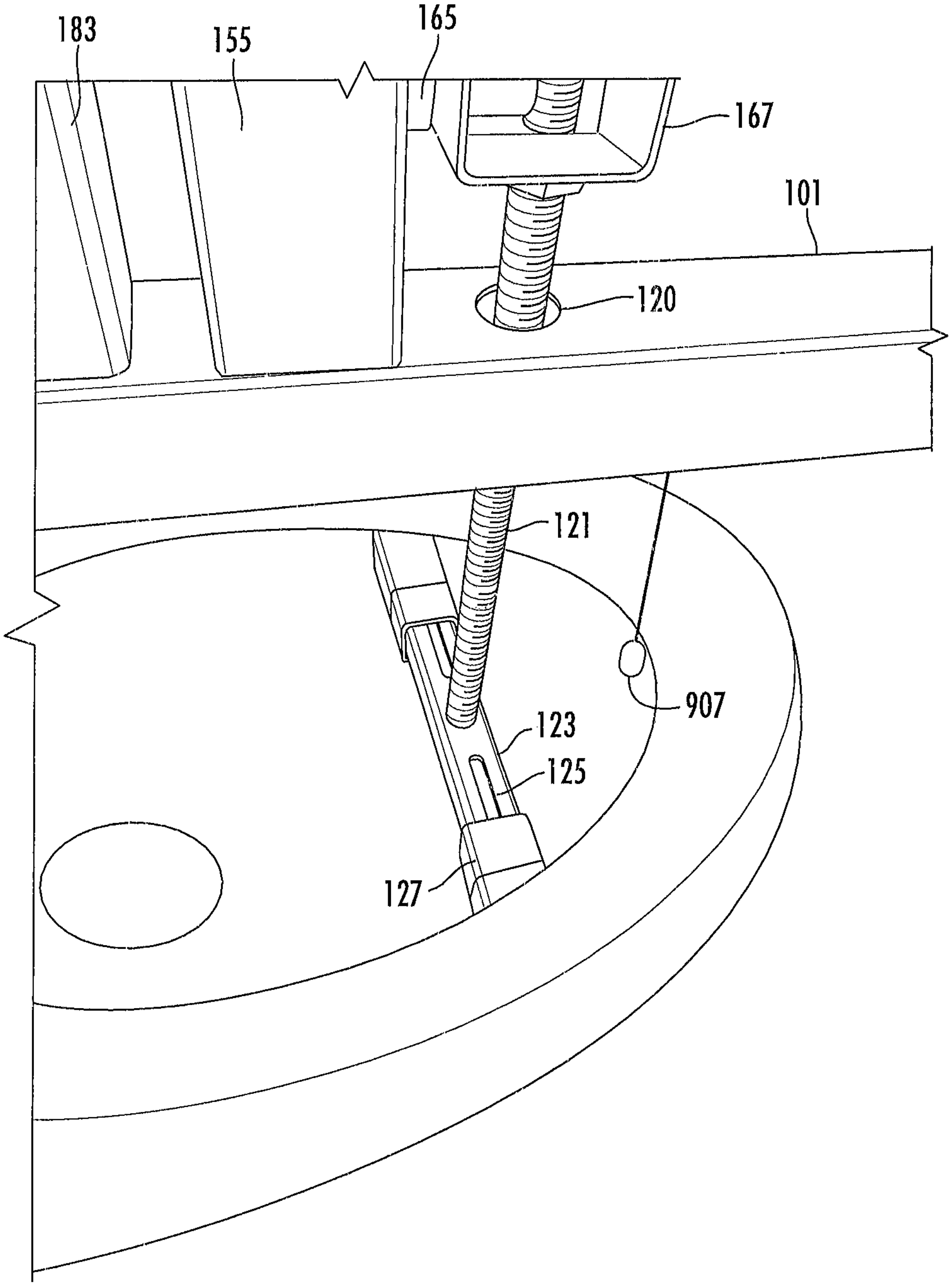
FIG. 9C is a partial perspective view of a toilet hoist with a toilet attached according to an alternative embodiment of the present invention.

Referring now also to FIG. 9C in the drawings, a partial perspective view of a toilet hoist is illustrated according to an alternative embodiment of the present invention. The toilet hoist illustrated in FIG. 9C is substantially similar to the toilet hoist shown in FIG. 1A. However, the toilet hoist shown in FIG. 9C also includes limiter 907. Limiter 907 is preferably configured as a safety measure to prevent the toilet from running into the base 101. Limiter 907 is preferably operably associated with the motion of the drive screws, such that when the toilet reaches a certain position the limiter operation is triggered and motion of the screws is stopped and therefore motion of the toilet is stopped, ideally preventing any damage to the toilet. It should be understood that alternative embodiments may include a differently shaped and sized limiter, or similar device, in various positions alternative to that which is illustrated herein.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application.

Accordingly, the protection sought herein is as set forth in the description. Although the present embodiments are shown above, they are not limited to just these embodiments, but are amenable to various changes and modifications without departing from the spirit thereof.

What is claimed is:

1. A toilet hoist for lifting a toilet, comprising:

a hoist base;

at least one leg coupled to the hoist base;

a drive system;

a power system configured for actuating the drive system; and a support mechanism system coupled to the drive system;

wherein the support mechanism system is configured to secure a toilet for hoisting;

wherein actuation of the drive system selectively alters the vertical position of the support mechanism system;

wherein the at least one leg is vertically adjustable; and wherein the drive system comprises at least two towers, each tower containing a drive screw configured for raising and lowering the support mechanism system.

2. The toilet hoist of claim 1, wherein the drive system comprises:

at least one acme threaded drive screw.

3. The toilet hoist of claim 1, wherein the at least one leg includes a wheel system coupled to a bottom portion of the leg.

4. The toilet hoist of claim 1, wherein the support mechanism system comprises:

a strap system.

5. The toilet hoist of claim 4, wherein the strap system comprises:

a support base moveably associated with the drive system;

at least one strap secured to a selected point on the at least one leg or the hoist base; and at least one hook coupled to an end of the at least one strap, the hook configured for securement to a toilet tank;

wherein the at least one strap may be tensioned to a selected level; and wherein a maximum tension level selection causes the strap to be snugly fit around the toilet tank, such that movement of the support base causes vertical movement of the toilet tank.

6. The toilet hoist of claim 1, wherein the support mechanism system comprises:

a support bar.

7. The toilet hoist of claim 6, wherein the support bar is a bar with two horizontally extending legs, the legs being configured for securely supporting the toilet via an inside lip of a toilet bowl.

8. The toilet hoist of claim 1, wherein the support mechanism system comprises:

a strap system; and a support bar;

wherein the strap system is configured for supporting a tank of the toilet; and wherein the support bar is configured for supporting a bowl portion of the toilet.

9. The toilet hoist of claim 1, wherein the power system comprises:

an unattached power drill.

10. The toilet hoist of claim 1, wherein the power system comprises:

at least one motor.

11. The toilet hoist of claim 1, wherein the power system is operated using at least one configuration from a group comprising:

a hydraulic system;

an electrical system;

a mechanical system; and a pneumatic system.

12. The toilet hoist of claim 1, further comprising:

at least two support pieces carried by the hoist base;

wherein the support pieces are removable; and wherein the support pieces are sized and shaped so as to stably support the weight of the toilet when placed under the toilet.

13. The toilet hoist of claim 1, further comprising:

a plurality of padded portions configured for preventing collisions between the hoist base, the support mechanism system, and the toilet.

14. The toilet hoist of claim 1, further comprising:

a control device configured for controlling the power system.

15. The toilet hoist of claim 14, wherein the control device is a wirelessly operated device.

16. The toilet hoist of claim 1, wherein the power system is operably associated with at least one of the following group, comprising:

at least one limit switch;

at least one switch;

at least one push button;

at least one sensor.

17. A method for installing a toilet, comprising:

providing a hoist for lifting and moving the toilet, the hoist comprising:

a base;

at least one vertically adjustable leg coupled to the base;

a drive system comprising at least two towers;

a power system configured for actuating the drive system; and a support mechanism system coupled to the drive system;

optionally adjusting the height of the hoist using the vertically adjustable leg;

activating the power system to trigger a drive screw found in the towers to lower the support mechanism;

securing the toilet to the hoist using the support mechanism system;

activating the power system to raise the toilet to a selected height;

moving the hoist and toilet over a selected location;

activating the power system to lower the toilet on to the selected location;

disconnecting the toilet from the hoist;

moving the toilet hoist away from the toilet; and securing the toilet onto the selected location.

18. The method of claim 17, wherein the support mechanism system comprises:

a strap system; and a support bar;

wherein the step of securing the toilet to the hoist further comprises:

securing the strap system around a tank of the toilet; and securing the support bar to a bowl of the toilet.

* * * * *